(12) United States Patent
Leventhal et al.

(10) Patent No.: US 10,320,558 B2
(45) Date of Patent: Jun. 11, 2019

(54) METHOD AND APPARATUS FOR A SECURE AND DEDUPLICATED WRITE ONCE READ MANY VIRTUAL DISK

(71) Applicants: David H Leventhal, Tucson, AZ (US); Robert F Barnitt, Paradise Valley, AZ (US)

(72) Inventors: David H Leventhal, Tucson, AZ (US); Robert F Barnitt, Paradise Valley, AZ (US)

(73) Assignee: DARK SIGNAL RESEARCH, LLC, Tucson, AZ (US)

( * ) Notice: Subject to any disclaimer, the term of this patent is extended or adjusted under 35 U.S.C. 154(b) by 900 days.

(21) Appl. No.: 13/866,257

(22) Filed: Apr. 19, 2013

(65) Prior Publication Data

US 2014/0157005 A1    Jun. 5, 2014

Related U.S. Application Data

(60) Provisional application No. 61/643,359, filed on May 7, 2012, provisional application No. 61/665,129, filed on Jun. 27, 2012.

(51) Int. Cl.
*H04L 9/08* (2006.01)
*H04L 9/06* (2006.01)
(Continued)

(52) U.S. Cl.
CPC .......... *H04L 9/0662* (2013.01); *G06F 21/79* (2013.01); *H04L 9/0637* (2013.01); *H04L 2209/125* (2013.01)

(58) Field of Classification Search
CPC ... H04L 9/0825; H04L 9/0662; H04L 9/0637; G06F 12/1408; G06F 21/602;
(Continued)

(56) References Cited

U.S. PATENT DOCUMENTS 6,489,974 B1 * 12/2002 Johnson .............. G06F 3/04817
715/771
7,849,440 B1 * 12/2010 Englehart .......... G06F 9/45504
715/762

(Continued)

OTHER PUBLICATIONS

Osuna et al., "Implementing IBM Storage Data Deduplication Solutions", Mar. 2011, p. 50.*

*Primary Examiner* — Yonas A Bayou
(74) *Attorney, Agent, or Firm* — Haverstock & Owens LLP; Thomas B. Haverstock

(57) ABSTRACT

A method and apparatus is provided for the operation of a secure and deduplicated write once read many virtual disk which exceeds the write performance of traditional cryptographic methods. This is achieved through the utilization of a time-memory tradeoff via the empty space on a virtual disk at format time. Traditionally empty space is zeroed to indicate that data is not present. When implementing the apparatus, the empty space is filled with the output of a symmetric-key algorithm uniquely keyed for that specific disk. From an information theoretic point of view, the format operation stores cryptographically structured data, rather than purely redundant data, enabling the write operation that encodes data to be stored on the disk to operate without additional cryptographic computation. This reduced computation requirement for encoding enables the computation required deduplication to operate as if encoding was not being performed, resulting in a net throughput increase.

18 Claims, 3 Drawing Sheets

(51) Int. Cl.
*G06F 12/14* (2006.01)
*G06F 21/79* (2013.01)

(58) Field of Classification Search
CPC ..... G06F 2212/1052; G06F 2221/2107; G06F 21/6218; G06F 21/72; G06F 21/78; G06F 21/79
See application file for complete search history.

(56) References Cited

U.S. PATENT DOCUMENTS

| | | | | |
|---|---|---|---|---|
| 8,308,544 | B2* | 11/2012 | Friedman | G07F 17/3295 463/16 |
| 8,424,904 | B2* | 4/2013 | Cech | B60R 11/0247 280/728.3 |
| 2003/0149869 | A1* | 8/2003 | Gleichauf | H04L 45/50 713/153 |
| 2009/0204650 | A1* | 8/2009 | Wong et al. | 707/204 |
| 2010/0304842 | A1* | 12/2010 | Friedman | G07F 17/32 463/25 |
| 2011/0082966 | A1* | 4/2011 | Yu et al. | 711/103 |
| 2011/0101654 | A1* | 5/2011 | Cech | B60R 11/0247 280/728.3 |
| 2011/0160544 | A1* | 6/2011 | Hayter | A61B 5/4833 600/300 |
| 2011/0271121 | A1* | 11/2011 | Imamoto | G11B 20/0021 713/193 |
| 2011/0288889 | A1* | 11/2011 | Jones | G06Q 50/22 705/3 |
| 2013/0054271 | A1* | 2/2013 | Langford | G06Q 50/24 705/3 |
| 2014/0032230 | A1* | 1/2014 | Gelber | G06Q 50/22 705/2 |

* cited by examiner

METHOD AND APPARATUS FOR A SECURE AND DEDUPLICATED WRITE ONCE READ MANY VIRTUAL DISK

FIELD OF THE INVENTION

This invention relates to the high performance storage of confidential and deduplicated data on write once read many media for transmission or long term storage.

BACKGROUND OF THE INVENTION

There are two trends that dominate technology today. The first is the ever-increasing amount of data which is being stored. As of 2013 the limit on the size of data sets that are feasible to process in a reasonable amount of time are on the order of the exabyte (EB) and the technological per-capita capacity to store information has roughly doubled every 40 months since the early 1980's. The large amount of data being stored and analyzed is often referred to as "Big Data" as discussed in [12]. The second is the flexible and widespread nature of data storage devices. Modern day storage is loosely coupled and often spread out over a large geographical area. Due to these trends, securing and deduplicating big data for transmission and storage is more important than ever.

The challenge presented is to encapsulate data in a manner where four major properties are maintained. These properties are data confidentiality, integrity, authentication, and compression. Confidentiality, or encoding, guarantees that the data can only be read and interpreted by an authorized party who possesses the key to that data. Integrity and authentication guarantee that when decoded, the data is in the exact same form as it was before encoding. Finally compression, or what is more commonly referred to as data deduplication, reduces the size of a data set by removing redundancy.

There are well established and government endorsed methods for providing confidentiality and authentication such as the Advanced Encryption Standard (AES) as defined in [1] and approved block cipher modes of operation when implementing AES as defined in [2]. There are also well established methods for providing data deduplication such as taught by George Henry Forman et al in U.S. Pat. No. 7,200,604 or taught by Haustein et al in US2010/0235332 and demonstrated in [10].

Even though methods for these technologies are well defined and established, there is room for significant improvement in the performance of the write operation. The invention presented will specifically address performance when the process of encoding data via symmetric-key algorithms such as AES and the process of data deduplication are combined and operate concurrently on subsequent blocks. This is a common occurrence since compression before encoding saves space in data storage and bandwidth in data transmission.

The invention is a write once read many virtual disk that allows the combination of both methods without the reduction in performance that would normally be observed due to processor contention between the encoding and deduplication operations. Write once read many virtual disks can be used as a mechanism of encapsulation that provides data confidentiality, integrity, authentication, and compression. This type of virtual disk can either be transmitted over a network or placed in long term storage.

The performance problem we will address is the write throughput when adding data to a virtual disk. The invention is a virtual disk that is designed to be written once and read as many times as needed based on the application. In computer science this type of disk is often referred to as write once read many or WORM. These types of file systems are extensively studied and there has been much work in optimizing write and read operations on non-encrypted data as demonstrated in [13].

In trying to speed up write performance the invention takes two computational bottlenecks into consideration. The first is the rate of compression as dictated by the deduplication algorithm and the second is the rate of encoding, which is dictated by the symmetric-key algorithm being utilized to provide confidentiality, integrity, and authentication.

When deduplicating or compressing data for storage, a cryptographic hash function is used that can generate significant processor load at high data rates as demonstrated in [11]. When encoding data the cryptographic functions that compose a symmetric-key algorithm can generate significant processor load as well. When these types of cryptographic functions are computed concurrently the aggregate throughput rate of the entire system can be cut in half or more due to processor contention.

To enable a high performance write method for a write once read many virtual disk the invention takes advantage of two techniques. The first is the operation of a block cipher as a stream cipher through the use of counter mode as demonstrated in [2] and [4], in order to produce a keystream. The second is the fact that a keystream can be generated before the actual data is available for storage and therefore precomputed as taught by Leventhal et al in US2007/0110225 and demonstrated by [7], [8], [9], and [13].

The invention utilizes the first technique in its format method using the empty space on a virtual disk as a cache and the second technique in its write method utilizing a precomputed keystream as a one-time pad. The details of the invention that facilitate these methods will be disclosed in the summary section.

A well-known example of the first technique that is utilized in traditional data storage is the disk cache. In order to optimize disk operation, data is brought into memory (cached) if it is expected to be accessed in the near future creating a higher burst transfer rate. In this manner the speed difference between primary and secondary storage (which can be substantial since a hard drive has mechanical components) can be blended at some level creating higher throughput.

A well-known example of the second technique is in the area of securing interprocessor communication in a tightly coupled multiprocessor system. This is accomplished by generating small keystream buffers that reside in processor caches which are used as a one time pad to reduce the latency generated by the use of cryptographic operations in symmetric-key algorithms as demonstrated in [5], [7], [8], and [13].

The invention addresses the need for confidentiality, integrity, authentication, and compression for the transmission and storage of big data by providing a write once read many virtual disk with performance characteristics that exceed other modern day solutions.

SUMMARY OF THE INVENTION

The invention provides a method and apparatus for a secure and deduplicated write once read many virtual disk with a high performance write operation. This is accomplished by addressing the two bottlenecks presented by the encoding and deduplicating operations in the following manner.

When encoding data for storage to a virtual disk, it makes sense to perform a time-memory tradeoff, as taught by Leventhal et al in US2007/0110225 and demonstrated by [5], taking advantage of excess space to speed up processor operations. For the invention, a cryptographic cache of data generated during the format operation is maintained in the empty space on the virtual disk that would otherwise go unutilized.

The high performance secure write operation of the invention is enabled by hiding the speed or computational limits of a processor that is tasked to execute a symmetric-key algorithm behind a cache. This is the same strategy that the microprocessor and storage industries use to speed up a variety of devices. For example, in the microprocessor space SRAM processor caches are used to hide the speed of DRAM, and in the storage space solid-state memory caches are used to hide the speed of mechanical disks.

In the invention, caching or trading space for time is used to address cryptographic performance. Cryptographic caches blend the substantial difference between the rate at which the processor can perform symmetric-key algorithm and memory speed through the use of precomputed keystreams, creating a higher burst throughput rate for encoding and consequently the write operation.

The invention addresses the deduplication bottleneck, which exists before the data is presented for encoding, by freeing processor resources that would normally be dominated by the symmetric-key algorithm used in encoding. Since multicore processors enable the concurrent operation of these two technologies, the inventions write method allows deduplication to operate at its normal throughput as if encoding was not being performed.

More specifically, during the format operation the empty space on the virtual disk residing in main memory is filled with the output of a symmetric-key algorithm operating in CTR or GCM mode as suggested in [2] and [4]. Later, when this disk is written, the cache residing in the empty space on the disk is used to manage the large differential between the processor symmetric-key encoding throughput and the throughput of a memory write if encoding was not being performed. In computational terms, the invention manages the difference in the amount of computation needed to perform an encoded write operation versus a write operation without encoding.

In algorithmic terms, the write operation operates at a higher rate because executing two "MOV REG, MEM[n]" instructions per data block, where n is the address of the keystream generated during the format operation, is computationally cheaper than operating a symmetric-key algorithm in real time. This is especially the case since two "MOV MEM[n], REG" instructions need to be executed in order to store the data without this mechanism. In this manner the empty space on the virtual disk is used to store information that is useful in the encoding process rather than just containing redundant data.

This is a direct application of temporal locality due to the fact that a memory write of the data is required in all cases. By including a memory read as well, we are able to take advantage of the fact that data is already cached and close to the processor. We also take advantage of spatial locality since there is an opportunity for the processor to pre-fetch arbitrary amounts keystream.

The inventions high performance write method for securing data on a write once read many virtual disk relies on the concept of early key generation. Early key generation is a process where a key is generated before write time, using a hardware based random number generator or a software based pseudorandom number generator as suggested by [3], in order to facilitate keystream generation during the format operation.

The validity of this concept rests on the fact that whether random number is generated at time A or time B it is mathematically equivalent. This concept of time independence concerning random number generation is taught by Leventhal et al in US2007/0110225.

The advantage the invention has over the methods taught by Leventhal is that Leventhal's methods require twice the memory space to store the precomputed keystream while the invention stores the keystream within the disk itself using no additional space.

For purposes of summarizing the benefit of the invention in terms of the encoding operation, we will compare the computational aspects of the AES versus the invention when performing I/O on write once read many virtual disks. The deduplication operation that is inherently performed before encoding will be assumed to be constant for the purpose of this analysis in order to separate out the processor load required by the encoding operation.

In our example we will assume AES-CTR with a 256-bit key running on an Intel processor with AES-NI support. Table I shows the number of processor cycles executed per AES block when encrypting a 4K buffer, as well as the cycles required for key setup. These numbers are taken from [6] and our own internal testing, and are representative of the fastest known software implementation of AES to date.

TABLE I clock cycles required for partial operations

| OPERATION | REAL TIME AES | REAL TIME AES-NI | WORM VIRTUAL DISK |
|---|---|---|---|
| block read | 3 | 3 | 3 + 3 = 6 |
| block write | 3 | 3 | 3 |
| block xor | 1 | 1 | 1 |
| block inc CTR | 1 | 1 | 0 |
| block AES encode | ~116 | 14 | 0 |

TABLE II clock cycles required for encryption

| OPERATION | REAL TIME AES | REAL TIME AES-NI | WORM VIRTUAL DISK |
|---|---|---|---|
| key setup | 1180 | 115 | 0 |
| block encode | 124 | 22 | 10 |
| byte encode | 7.74 | 1.375 | 0.625 |
| comparison | 1x | 5.62x | 12.38x* |

*this range is dependent on the alignment of instructions on a superscalar processor and the efficiency of the caching and memory subsystems In Table I we have approximately 124 cycles per block for AES implemented in software and 22 cycles per block for hardware assisted AES. When using the invention, data is encoded at a rate of 10 cycles per block (four 128-bit MOV instructions done in parallel to bring keystream into registers and four 128-bit XOR instructions done in parallel to combine the data), giving the invention a 12.38x advantage over the fastest known software implementations of AES and a 2.2x advantage over hardware assisted methods such as AES-NI. From an I/O vs. CPU load perspective this equates to 90% I/O and 10% CPU for the invention and 27%

I/O and 72% CPU for AES-NI. This offers a significant advantage when dealing with a flooded I/O bus. If for arguments sake the I/O bus is flooded at 8 GBps, then the invention would run at 7.2 GBps, while AES-NI would only achieve 2.16 GBps of throughput. This is 3.33× slower and uses 7.2× more CPU time. This means that in a parallel situation the invention could potentially achieve the same performance on 1 core that AES-NI would require 7 cores to achieve. The invention can also perform an 8 byte encryption in only a few clock cycles, while software and hardware assisted implementations of AES can require 1188 and 116 cycles respectively.

This is possible because all AES computation per block, whether done in hardware or software, is replaced with two MOV instructions. Two XOR instructions are executed to combine the plaintext with the keystream but those two XOR instructions are required in AES-CTR or AES-GCM as well so they are not relevant when making a comparison. Another important observation is that the invention does not have to account for the cycles needed for key setup since this step was performed at an earlier time when the virtual disk was formatted.

While only achieving slightly more than double the rate in a pure encryption scenario when there are no other aspects of the system to consider, as soon as deduplication is introduced, processor load and contention becomes an important factor. In other words, the reduced computation of the invention enables secure deduplication to proceed without a substantial loss in throughput.

The following code implements the invention as measured above taking advantage of the same 128-bit registers and specialized op codes found in a typical AES-NI implementation. This code example is meant in no way to limit the implementation of the invention on other types of processors and only serves as an example on the current Intel architecture. This example also does not preclude the notion that there is a more efficient implementation available, or that there might be a more efficient implementation available at some future date.

TABLE III invention implemented in x64 assembler using and AVX

```
; 8 reads, 4 xors, 4 writes
; reads done in parallel in pipeline (single core)
; xors done in parallel in pipeline (single core)
; writes done in parallel in pipeline (single core) AND bypass cache
align 16
loop:
        movdqa xmm0, [rcx] ; read 64 bytes plaintext
        movdqa xmm1, [rcx + 16]
        movdqa xmm2, [rcx + 32]
        movdqa xmm3, [rcx + 48]
        movdqa xmm4, [rdx] ; read 64 bytes keystream
        movdqa xmm5, [rdx + 16]
        movdqa xmm6, [rdx + 32]
        movdqa xmm7, [rdx + 48]
            pxor    xmm0, xmm4 ; xor 64 bytes with keystream
            pxor    xmm1, xmm5
            pxor    xmm2, xmm6
            pxor    xmm3, xmm7
            movntdq [rdx], xmm0 ; write 64 bytes ciphertext and
            bypass cache
            movntdq [rdx + 16], xmm1
            movntdq [rdx + 32], xmm2
            movntdq [rdx + 48], xmm3
            add     rcx, 64 ; advance data pointers 64 bytes
            add     rdx, 64
            sub     rax, 4 ; loop while blocks
jnz     oop
```

The following code implements the invention as measured above, taking advantage of the same 256-bit registers and specialized op codes available in the Intel AVX2 instruction set. This has the potential to double the speed of the invention due to the improved register profile. This code example is meant in no way to limit the implementation of the invention on other types of processors and only serves as an example on the current Intel architecture. This example also does not preclude the notion that there is a more efficient implementation available, or that there might be a more efficient implementation available at some future date.

```
align 16
loop:
        vmovdqa ymm0, [rcx] ; read 8 blocks plaintext
        vmovdqa ymm1, [rcx + 32]
        vmovdqa ymm2, [rcx + 64]
        vmovdqa ymm3, [rcx + 96]
        vmovdqa ymm4, [rdx] ; read 8 blocks keystream
        vmovdqa ymm5, [rdx + 32]
        vmovdqa ymm6, [rdx + 64]
        vmovdqa ymm7, [rdx + 96]
        vpxor   ymm0, ymm4
        vpxor   ymm1, ymm5
        vpxor   ymm2, ymm6
        vpxor   ymm3, ymm7
        vmovntdq [rdx], ymm0 ; write 8 blocks ciphertext and bypass
        cache
        vmovntdq [rdx + 32], ymm1
        vmovntdq [rdx + 64], ymm2
        vmovntdq [rdx + 96], ymm3
        add         rcx, 128 ; advance data pointers 8 blocks
        add         rdx, 128
        sub         rax, 8 ; loop while blocks
        jnz         loop
```

The following code implements AES-NI as compared and contrasted to the invention previously described. This code example is not meant to suggest that it is the most efficient means of implementing AES-NI on the current Intel architecture. This example also does not preclude the notion that there is a more efficient implementation available, or that there might be a more efficient implementation available at some future date.

TABLE IV

AES-CTR implemented in x64 assembler using AES-NI and AVX

```
; 4 reads, 4 ctr incs, 14 rounds AES, 4 xors, 4 writes
; reads done in parallel in pipeline (single core)
; ctr increments done in parallel in pipeline (single core)
; AES done in parallel in pipeline (single core)
; xors done in parallel in pipeline (single core)
; writes done in parallel in pipeline (single core) AND bypass cache
align 16
counter_add_one:
DD 1
DD 0
DD 0
DD 0
counter_add_two:
DD 2
DD 0
DD 0
DD 0
counter_add_three:
DD 3
DD 0
DD 0
DD 0
```

TABLE IV-continued

AES-CTR implemented in x64 assembler using AES-NI and AVX

```
counter_add_four:
DD 4
DD 0
DD 0
DD 0
%macro aesenc4_256 1
        movdqa xmm4,%1
        aesenc xmm0,xmm4
        aesenc xmm1,xmm4
        aesenc xmm2,xmm4
        aesenc xmm3,xmm4
%endmacro
%macro aesenclast4_256 1
        movdqa xmm4,%1
        aesenclast xmm0,xmm4
        aesenclast xmm1,xmm4
        aesenclast xmm2,xmm4
        aesenclast xmm3,xmm4
%endmacro
pxor xmm0, xmm0 ; zero ctrs
pxor xmm1, xmm1
pxor xmm2, xmm2
pxor xmm3, xmm3
align 16
loop:
        movdqa xmm5, [rcx] ; read 4 blocks plaintext
        movdqa xmm6, [rcx + 16]
        movdqa xmm7, [rcx + 32]
        movdqa xmm8, [rcx + 48]
        paddd xmm0,[rel counter_add_one] ; inc ctrs
        paddd xmm1,[rel counter_add_two]
        paddd xmm2,[rel counter_add_three]
        paddd xmm3,[rel counter_add_four]
        pxor xmm0, [aesni_expanded_key] ; whitening (key 0)
        pxor xmm1, [aesni_expanded_key]
        pxor xmm2, [aesni_expanded_key]
        pxor xmm3, [aesni_expanded_key]
        aesenc4_256 [aesni_expanded_key + (16 * 1)] ; 14 rounds
        (keys 1-14)
        aesenc4_256 [aesni_expanded_key + (16 * 2)]
        aesenc4_256 [aesni_expanded_key + (16 * 3)]
        aesenc4_256 [aesni_expanded_key + (16 * 4)]
        aesenc4_256 [aesni_expanded_key + (16 * 5)]
        aesenc4_256 [aesni_expanded_key + (16 * 6)]
        aesenc4_256 [aesni_expanded_key + (16 * 7)]
        aesenc4_256 [aesni_expanded_key + (16 * 8)]
        aesenc4_256 [aesni_expanded_key + (16 * 9)]
        aesenc4_256 [aesni_expanded_key + (16 * 10)]
        aesenc4_256 [aesni_expanded_key + (16 * 11)]
        aesenc4_256 [aesni_expanded_key + (16 * 12)]
        aesenc4_256 [aesni_expanded_key + (16 * 13)]
        aesenclast4_256 [aesni_expanded_key + (16 * 14)]
        pxor xmm5, xmm0 ; combine ctrs with plaintext
        pxor xmm6, xmm1
        pxor xmm7, xmm2
        pxor xmm8, xmm3
        movntdq [rdx], xmm5 ; write 4 blocks ciphertext and bypass
cache
        movntdq [rdx + 16], xmm6
        movntdq [rdx + 32], xmm7
        movntdq [rdx + 48], xmm8
        add rcx, 64 ; advance data pointers 4 blocks
        add rdx, 64
        sub rax, 4 ; loop while blocks
jnz loop
```

Performance analysis is not as simple as the ratio of instructions needed to perform the mathematical transformation of a plaintext block using AES. Due to the complexity involved in modern processors and operating systems, such as the actual time to move memory into registers, the exact performance metrics are hard to determine in a theoretical context. The inventions benefit is highly dependent on the latency and speed of memory. In fact, since processor saturation is taken out of the loop, the inventions encoding optimization and consequent write operation depends purely on the speed in which memory can be moved into registers and those registers can be combined with the data to be stored using an exclusive or operation.

For purposes of summarizing the benefit of the invention in terms of the deduplication operation, we will assume that the deduplication algorithm uses cryptographic hash functions to identify duplicate data and therefore competes for computational time with the encoding operation.

Since there is processor contention between the two operations described above, they could not normally operate in a concurrent manner without the benefit of the invention due to a significant loss in throughput. With the invention data can be written to storage at a higher rate and the process does not become CPU bound because the two cryptographic methods, the first for compression and the second for encoding, do not compete with each other for processor resources. This is where the I/O vs. CPU load perspective becomes important to take into consideration. As stated above, the invention uses with 90% I/O bandwidth and 10% CPU bandwidth and computing AES-CTR in real time uses 27% I/O bandwidth and 72% CPU bandwidth. Since the invention uses 7.2× less CPU bandwidth, it can be a significant advantage in the presence of deduplication.

The performance of the inventions read method for extracting data from a write once read many virtual disk does not offer the performance increase that the write method provides. Decoding is performed by operating the symmetric-key algorithm in real time followed by reduplication.

It should be noted that the invention can operate using parallel processing for the format operation in order to speed up the process of virtual disk formatting.

BRIEF DESCRIPTION OF THE DRAWINGS

The accompanying drawings illustrate embodiments of the invention and, together with the description, serve to explain the principles of the invention. The applications disclosed are for illustrative purposes only, and are not meant to restrict the scope of the present invention. Embodiments in accordance with the present invention are relevant to all types of data.

DETAILED DESCRIPTION OF THE PREFERRED EMBODIMENTS

In order to illustrate the invention, we will treat a write once read many virtual disk as if it was a physical disk with WORM properties just as many operating systems and hypervisors treat virtual disks as the representation of a physical disk that resides in main memory. We will divide the operation of the invention as a system into its corresponding format, write, and read methods or operations. We will also separate the encoding operation which is coupled with the write method, the decoding operation which is coupled with the read method, and deduplication and reduplication which are coupled with the write and read methods respectively.

In order to illustrate the format method of the invention, we will use AES as an example symmetric-key algorithm, with a 256-bit key and a 128-bit block size, operating in counter mode (CTR) with a 96-bit nonce and 32-bit counter. The selection and use of AES-CTR in the following descriptions and examples is not meant to restrict the format method of the present invention in any manner. It should be known that the present invention can be implemented with any block cipher using a key or block size comprising any number of bits. Also any reasonable scheme for generating and concatenating nonce and counter values comprising any number of bits can be used as long as each nonce and counter value concatenation is unique per block generated. For example, on a 64-bit operating system it may be desirable to make the counter 64-bits rather than 32-bits.

Any mode of operation, such as AES-GCM if authenticated encryption is desired, can be used as long as that mode is capable of converting a block cipher into a stream cipher. For the specification of AES-GCM see [4].

All references to memory in the following descriptions of the preferred embodiments should be understood to imply a combination of processor cache and primary storage. We will define processor cache as memory which is located on the physical processor and primary storage as fast memory that is tightly coupled to the processor such as high-speed cache or Random Access Memory (RAM). It should be noted that secondary storage defined as slower memory that is more loosely coupled to the processor such as a solid state drive can also be considered primary storage in some cases.

Figure 1:
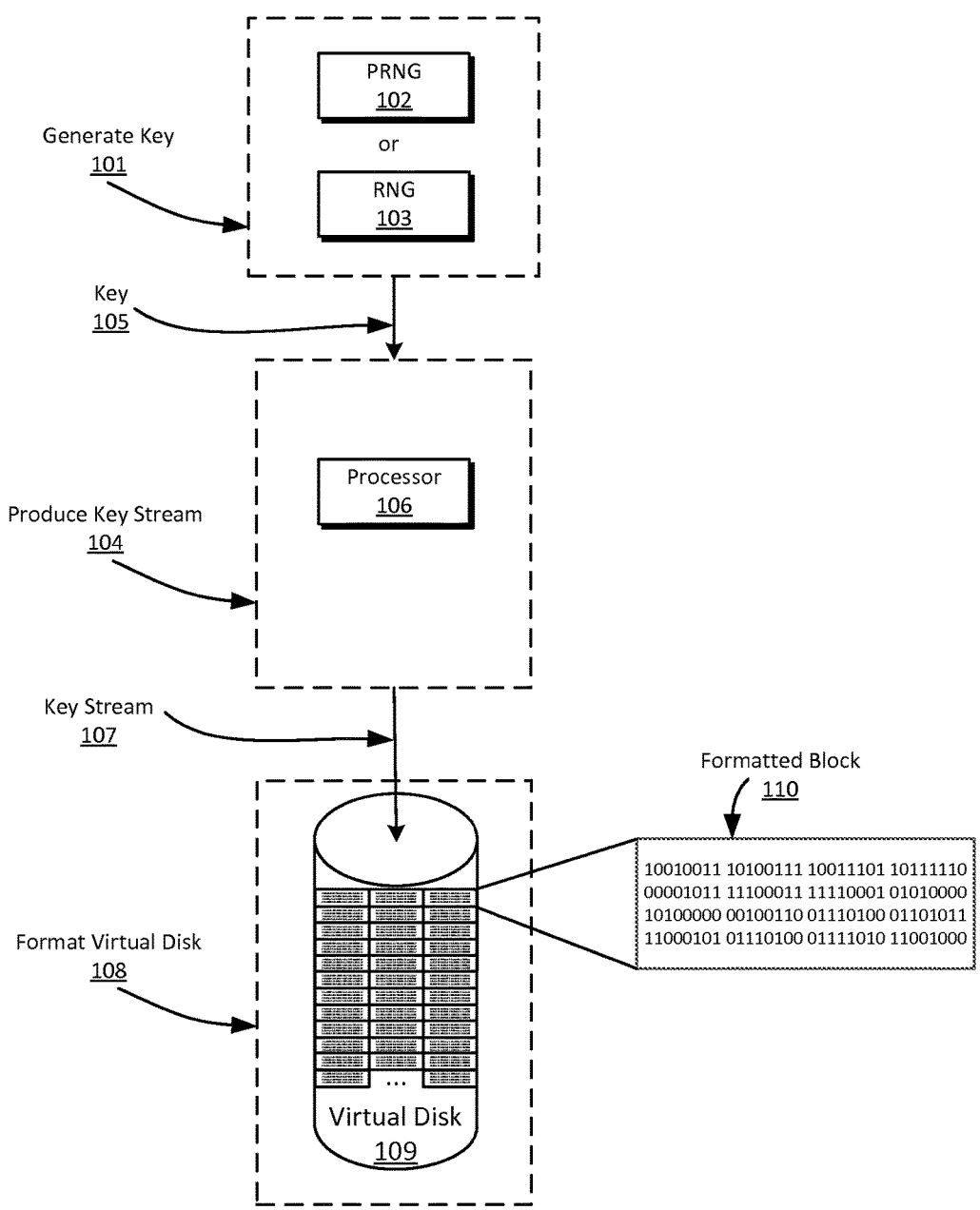
FIG. 1 is a schematic of the system performing a format operation.

FIG. 1 illustrates the format method of the invention where during the format operation processor cycles in a computing system are used in order to generate a keystream and write the keystream to a write once read many virtual disk. For the purpose of illustration we will present method using a single processor core for keystream generation with the understanding that multiple cores can be utilized to generate multiple partitions of the keystream in parallel. FIG. 1 also illustrates the keying component of the format method in order to key the symmetric-key algorithm that is being utilized.

Generate Key 101 uses a Pseudorandom Number Generator (PRNG) 102 or Random Number Generator (RNG) 103 to generate Key 105 for use with AES in Format Virtual Disk 108 as illustrated by the pseudo code in Table V. For best practices concerning pseudorandom number generation, see [3].

More specifically let $k_i$=RNG be the generation of a 256-bit symmetric key using a cryptographically secure random or pseudorandom number generator. We can generate a key set composed of n 256-bit keys $k_1, k_2, \ldots k_n$ by sequentially calling the random or pseudorandom number generator.

TABLE V

For i = 1 to n
   $k_i$ = RNG( )
EndFor

Format Virtual Disk 108 uses Key 105 provided by Generate Key 101 to key AES and operate Produce Key Stream 104 of which is written sequentially to Virtual Disk 109, using cycles from Processor 106 as illustrated in Table VI.

More specifically, let M be defined as Virtual Disk 109 with a capacity of m 128-bit blocks where a keystream of length j 128-bit blocks will be stored. Let $M_i = E_k(N\|i)$ for i=1 . . . j be defined as the 128-bit value written to each memory location $M_i$ where $E_k$ is the encryption function of AES using a 256-bit key k previously generated in Generate Key 101, N is a 96-bit psuedorandom nonce, and i is a 32-bit counter incremented for the generation of each block with j<=m. The result of this computation is written to Virtual Disk 109 in the form of Formatted Block 110.

TABLE VI

Figure 2:
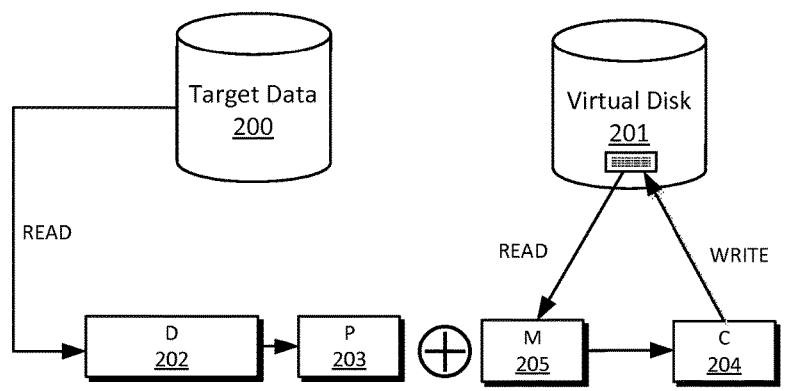
FIG. 2 is a schematic of the system performing a write operation.

While(MoreSpaceToFormat( ))
   For i = 1 to j
      $M_i = E_k (N\| i)$
      FormatVirtualDiskBlock($M_i$)
   EndFor
EndWhile FIG. 2 illustrates the write method according to an embodiment of the present invention. We will assume a Target Data 200 and a previously formatted Virtual Disk 201 are available in memory. Each block of data is first deduplicated and then encoded using a corresponding block read from the Virtual Disk 201 that was generated according to the method outlined in FIG. 1. This process of deduplicating then encoding is illustrated in Table VII.

More specifically let $D_1, D_2, \ldots D_n$ or D 202 represent Target Data 200 of n 128-bit blocks that are deduplicated. Let $P_1, P_2, \ldots P_n$ or P 203 represent a plaintext, after the previous deduplication step, of n 128-bit blocks and j be the number of 128-bit blocks of Virtual Disk 201 available in memory. Let the instructions executed for encoding each plaintext block $P_i$ be defined as $C_i = P_i \oplus M_i$, i<=j. Let $C_1, C_2, \ldots C_n$ or C 204 represent the resulting ciphertext of n 128-bit blocks where M 203 is a preformatted block.

TABLE VII

For i = 1 to n
   $D_i$ = DeduplicateBlock(i)
   $P_i$ = GetPlaintextBlock($D_i$)
   $C_i = P_i \oplus$ VirtualDiskBlock$_i$
   WriteBackVirtualDiskBlock($C_i$)
EndFor Even though FIG. 2 illustrates the write method using the same size blocks for deduplication D 202 as well as encoding P 203, it should be assumed that the block size for each operation is independent of each other. It should also be noted that each encoded block C 204 written to Virtual Disk 201 resides in the same location as the original block M 203 present from the format operation. In this manner no additional space is required for the operation as a whole.

Figure 3:
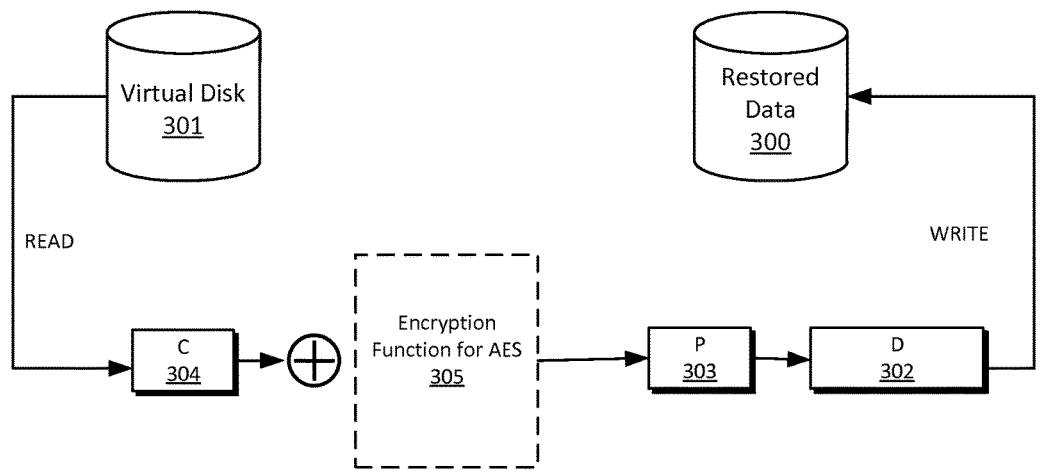
FIG. 3 is a schematic of the system performing a read operation.

FIG. 3 illustrates read method according to an embodiment of the present invention. We will assume a previously written Virtual Disk 301 is available in memory that was either transmitted to the reading computer via a network connection or presented via a storage controller on media that was in long term storage.

Each block of data in Virtual Disk 301 is decoded and reduplicated as illustrated in Table VIII.

More specifically let the instructions executed for decoding each 128-bit ciphertext block $C_i$ or C 304 be $P_i = E_k(N\|i) \oplus C_i$, where $E_k$ is the Encryption Function 305 for AES using a 256-bit key k, N is a 96-bit pseudorandom nonce, i is a 32-bit counter incremented for the processing of each block, and n is the total number of 128-bit blocks, with i>j. Let $D_1, D_2, \ldots D_n$ or D 302 represent Resulting Data 300 of n 128-bit blocks that are reduplicated from blocks $P_1, P_2, \ldots P_n$ or P 303 resulting from the decoding operation.

TABLE VIII

```
For i = 1 to n
    C_i = GetVirtualDiskBlock(i)
    P_i = E_k (N|| i) ⊕ C_i
    ReduplicateBlock(P_i)
EndFor
```

For the read operation of the invention the computational rate of the symmetric-key algorithm will dictate the level of performance. For the details concerning the options for generating and concatenating counter and nonce values for a specific key see [2]. Also note that only the encryption function of the symmetric-key algorithm is needed when operating in CTR or GCM mode.

Figure 4:
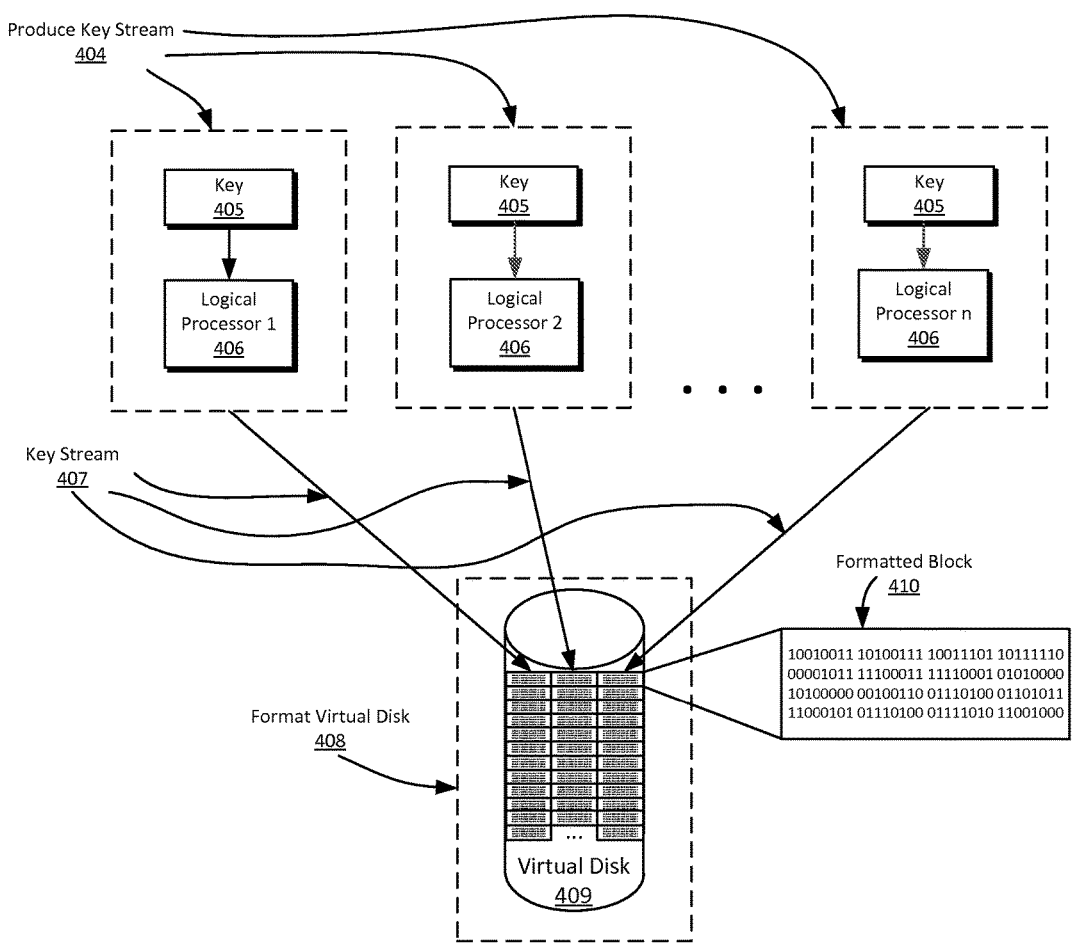
FIG. 4 is a schematic of the system performing a format operation using parallel processing.

FIG. 4 illustrates the method of using arbitrary parallelism while performing the format method according to an embodiment of the present invention. For the purpose of illustration we will define a logical processor as a thread of execution that is capable of performing instructions on a data stream independent of the logical or physical implementation of multiprocessing specific to that system.

Multiprocessor capability can be presented to the invention through multiple physical processors, processor cores, or a processor or operating system threading mechanism. The method of parallelization we will present is based on the simple structure of dividing Virtual Disk 409 into multiple sequential partitions and operating on those partitions in parallel.

A Virtual Disk 409 is divided up into n partitions which each serve as input to n Logical Processors 406. Each Logical Processor 406 is responsible for formatting a partition of Virtual Disk 409 as illustrated in Table IX.

More specifically let $V_1, V_2, \ldots, V_n$ be a set of n Virtual Disk 409 partitions. Let $L_1, L_2, \ldots, L_n$ represent n logical processors. Each logical processor $L_k$ generates a corresponding partition of keystream using Produce Key Stream 404 and writes it to Virtual Disk 409 partition $V_k$. Let M be defined as Virtual Disk 409 partition with a capacity of m 128-bit blocks where a Key Stream 407 of length j 128-bit blocks will be stored. Let $M_i=E_k(N||i)$ for $i=1 \ldots j$ be defined as the 128-bit value written to each memory location $M_i$ where $E_k$ is the encryption function of AES using a 256-bit Key 405 generated as illustrated in FIG. 1 Generate Key 101, N is a 96-bit psuedorandom nonce, and i is a 32-bit counter incremented for the generation of each block with $j<=m$ in the form of Formatted Block 410.

TABLE IX

```
ForEach Logical Processor k = 1 to n
    While(V_i = MoreSpaceToFormat(L_k))
        For i = 1 to j
            M_i = E_k (N|| i)
            FormatVirtualDiskBlock(V_i, L_k, M_i)
        EndFor
    EndWhile
EndFor
```

The degree of parallel operation the invention is able to create is defined by the number of logical processors available for generating the key stream used to format Virtual Disk 409. The maximum theoretical speedup can be defined as i/n where i is the symmetric-key algorithm encoding rate and n is the number of logical processors. The actual speedup will depend on the architecture of the computing system executing the algorithm based on its ability to cache data from multiple memory streams and other hardware specific issues when executing parallel operations.

It should be noted that when using the invention the actual encoding performed by the system is mathematically equivalent to encoding performed by a system that is not using the invention. Therefore if data is written to the invention (a write once read many storage system) it can be read from the invention and decoded and reduplicated without the inventions read method since any device that has the equivalent symmetric-key algorithm and reduplication algorithm can read the data.

While certain embodiments have been described above, other embodiments will be obvious in view of the above description to those skilled in the art. For example, the invention will work with any symmetric-key block cipher such as DES or Triple-DES, in which a block cipher can be transformed into a stream cipher using certain modes of operation such as CTR (counter) mode, OFB (output feedback) mode, and CFB (cipher feedback) mode. It should be understood that the invention could be practiced with modification and alteration within the spirit and scope of the appended claims. The description above is not intended to be exhaustive or to limit the invention to the precise form disclosed. It should be understood that the invention can be practiced with modification and alteration and that the invention be limited only by the claims and the equivalents thereof.

REFERENCES CITED

U.S. Patent Documents

US2010/0235332 "Apparatus and method to deduplicate data" Haustein et al, Ser. No. 12/404,988, Mar. 16, 2009

U.S. Pat. No. 7,433,472 "Digital content distribution system", Ivan Hugh McLean et al, Oct. 7, 2008

EP1732259 B1 "Method and system for securely storing and transmitting data by applying a one-time pad", Paul Gleichauf, Cisco Technology, Inc., Jun. 25, 2008

U.S. Pat. No. 7,200,604 "Data de-duplication", George Henry Forman et al, Apr. 3, 2007

US2007/0110225 A1 "Method and apparatus for efficient encryption", Leventhal et al, Ser. No. 11/281,138, Nov. 16, 2005

Other Publications

1. "Advanced Encryption Standard", NIST PUB 197, National Institute of Standards and Technology, November 2001.
2. "Recommendation for Block Cipher Modes of Operation: Methods and Techniques", NIST SP 800-38A, National Institute of Standards and Technology, December 2001.
3. "Recommendation for Random Number Generation Using Deterministic Random Bit Generators (Revised)", NIST SP 800-90, National Institute of Standards and Technology, March 2007.
4. "Recommendation for Block Cipher Modes of Operation: Galois/Counter Mode (GCM) and GMAC", Dworkin, M., National Institute of Standards and Technology SP 800-38D, November 2007.
5. "Fast Encryption and Authentication for Cache-to-Cache Transfers using GCM-AES" Jannepally, V., Sohoni, S., International Conference on Sensors, Security, Software and Intelligent Systems, January 2009.
6. Intel® Advanced Encryption Standard (AES) Instructions Set—Rev 3.01, Shay Gueron (Intel), August 2012.
7. "Efficient memory integrity verification and encryption for secure processors" Suh, G. E., Clarke, D., Gasend, B., van Dijk, M., Devadas, S., Computer Science & Artificial Intelligence Lab., MIT, Cambridge, Mass., USA, Microarchitecture, 2003. MICRO-36. Proceedings. 36th Annual IEEE/ACM International Symposium on
8. "Single-Level Integrity and Confidentiality Protection for Distributed Shared Memory Multiprocessors", Brian Rogers, Dept. of Electrical & Computer Engineering, North Carolina State Univ., Raleigh, N.C., Chenyu Yan, Sidhartha Chhabra, Milos Prvulovic, Yan Solihin. Proceedings of the 14th IEEE International Symposium on High-Performance Computer Architecture (HPCA), pages 161-172, February 2008
9. "Efficient All-or-Nothing Encryption Using CTR Mode", Robert P. McEvoy, and Colin C. Murphy, SECRYPTIN-STICC Press (2006), p. 237-245
10. "Reducing the storage burden via data deduplication", D. Geer, Computer, 41(12):15-17, 2008.
11. "ChunkStash: speeding up inline storage deduplication using flash memory", B Debnath, S Sengupta, J Li, 2010 USENIX
12. "The promise and peril of big data", D. Bollier, Communications and Society Program, Charles M. Firestone, Executive Director, Washington, D.C. 2010.
13. "I2SEMS: Interconnects-Independent Security Enhanced Shared Memory Multiprocessor Systems", M. Lee, M. Ahn, and E. Kim, International Conference on Parallel Architectures and Compilation Techniques, 2007.
14. "A cached worm file system", S Quinlan, Software: Practice and Experience, 1991

What is claimed is:

1. A method of preparing a secure write once read many virtual disk comprising the steps of:
 a. generating an encryption sequence;
 b. storing the encryption sequence into a location on the virtual disk;
 c. accessing a data file to be stored;
 d. combining the data file with the encryption sequence forming a secure data file, wherein the encryption sequence is at least of equal size to the data file; and
 e. storing the secure data file into the same location on the virtual disk in which the encryption sequence was previously stored.

2. The method according to claim 1 wherein the steps of generating and storing the encryption sequence can be performed in parallel using one of multiple CPUs, multi-core CPUs or a combination thereof.

3. The method according to claim 1 wherein the step of combining comprises exclusive ORing the data file with the encryption sequence.

4. A method of preparing a secure write once read many virtual disk comprising the steps of:
 a. generating a random number for use as a key in a symmetric-key algorithm;
 b. using the key with the symmetric-key algorithm in counter mode to form a keystream;
 c. storing the keystream into a location on the virtual disk;
 d. accessing a data file to be stored;
 e. combining the data file with the keystream forming a secure data file, wherein the keystream is at least of equal size to the data file; and
 f. storing the secure data file into the same location on the virtual disk in which the keystream was previously stored.

5. The method according to claim 4 wherein the steps of generating and storing the keystream can be performed in parallel using one of multiple CPUs, multi-core CPUs or a combination thereof.

6. The method according to claim 4 wherein the step of combining comprises exclusive ORing the data file with the encryption sequence.

7. A method of preparing a secure and deduplicated write once read many virtual disk comprising the steps of:
 a. generating a random number for use as a key in a symmetric-key algorithm;
 b. using the key with the symmetric-key algorithm in counter mode to form a keystream;
 c. storing the keystream into a location on the virtual disk;
 d. accessing a data file to be stored;
 e. deduplicating the data file to form a deduplicated data file;
 f. combining the deduplicated data file with the keystream forming a secure and deduplicated data file, wherein the keystream is at least of equal size to the data file; and
 g. storing the secure and deduplicated data file into the same location on the virtual disk in which the keystream was previously stored.

8. The method according to claim 7 wherein the step of storing the encryption sequence can be performed in parallel using one of multiple CPUs, multi-core CPUs or a combination thereof.

9. The method according to claim 7 wherein the step of combining comprises exclusive ORing the data file with the encryption sequence.

10. The method according to claim 7 wherein the step of deduplicating the data file comprises eliminating duplicate copies of redundant data.

11. A secure write once read many virtual disk system comprising:
 a. a system element for forming an encryption sequence and storing the encryption sequence into a location on the virtual disk;
 b. a processor for combining a data file with the encryption sequence to form a secure data file, wherein the secure data file is stored into the same location on the virtual disk in which the encryption sequence was previously stored, wherein the encryption sequence is at least of equal size to the data file.

12. A secure write once read many virtual disk system comprising:
 a. a system element for generating a random number for use as a key in a symmetric-key algorithm;
 b. a processor for using the key with the symmetric-key algorithm in counter mode to form a keystream wherein the processor stores the keystream into a location on the virtual disk; and
 c. the processor is configured to access a data file to be stored and combing the data file with the keystream to form a secure data file, wherein the secure data file is stored into the same location on the virtual disk in which the keystream was previously stored, and further wherein the keystream is at least of equal size to the data file.

13. The system according to claim 12 wherein the system element for generating a random number comprises a hardware based random number generator.

14. The system according to claim 12 wherein the system element for generating a random number comprises a software based pseudorandom number generator.

15. A secure and deduplicated write once read many virtual disk system comprising:
 a. a random number generator for generating a key for use in a symmetric-key algorithm;

b. a processor for using the key with the symmetric-key algorithm in counter mode to form a keystream and storing the keystream into a location on the virtual disk;

c. the processor configured to access a data file to be stored and to deduplicate the data file to form a deduplicated data file;

d. the processor configured to combine the deduplicated data file with the keystream forming a secure and deduplicated data file, wherein the secure and deduplicated data file is stored into the same location on the virtual disk in which the keystream was previously stored, and further wherein the keystream is at least of equal size to the data file.

16. The system according to claim 15 wherein the system element for generating a random number comprises a hardware based random number generator.

17. The system according to claim 15 wherein the system element for generating a random number comprises a software based pseudorandom number generator.

18. The system according to claim 15 wherein the processor is adapted to read the secure data file, by regenerating the keystream and using it to extract the data file from the secure data file.

\* \* \* \* \*